United States Patent [19]
Hirano et al.

[11] 3,815,087
[45] June 4, 1974

[54] APPARATUS FOR PREVENTING THE DRIVING OF AN AUTOMOBILE OR THE LIKE WHEN THE OPERATOR IS UNDER THE INFLUENCE OF ALCOHOL

[75] Inventors: Tadao Hirano, Agei-gun; Sadasuke Toda, Suzuka; Katuo Okugawa, Suzuka; Kazutaka Monden, Suzuka, all of Japan

[73] Assignee: Honda Giken Kogyo Kabushiki Kaisha, Tokyo, Japan

[22] Filed: Oct. 26, 1972

[21] Appl. No.: 300,995

[30] Foreign Application Priority Data
Oct. 27, 1971   Japan................................ 46-84640

[52] U.S. Cl...................... 340/53, 340/279, 180/99
[51] Int. Cl. .......................................... G08b 21/00
[58] Field of Search............ 340/52 R, 53, 237, 279; 180/82.7, 99; 128/2 C; 73/421.5 R

[56] References Cited
UNITED STATES PATENTS
3,186,508   6/1965   Lamont................................. 180/99
3,559,206   1/1971   Beecham.......................... 340/279 R

*Primary Examiner*—Alvin H. Waring
*Attorney, Agent, or Firm*—Eric H. Waters

[57] ABSTRACT

An apparatus is provided for preventing an operator from driving a motorcar or the like when under the influence of alcohol. The apparatus detects the alcohol content in the exhalation of the driver and selectively makes the motorcar impossible to drive. Detecting apparatus is also provided for detecting the alcoholic content of the exhalation of a fellow passenger. In the event that a fellow passenger is under the influence of alcohol but not the driver, operation of a ventilation apparatus is initiated for venting the interior of the motorcar. This prevents the operation of the first noted detecting apparatus and prevents rendering the motorcar inoperative. Furthermore, an apparatus is provided for restoring the operability of the motorcar. Preferably the detecting apparatus is associated with a Zener diode, which operates a relay, which separates, for example, the ignition circuit of the motorcar from its power supply.

7 Claims, 2 Drawing Figures

3,815,087

APPARATUS FOR PREVENTING THE DRIVING OF AN AUTOMOBILE OR THE LIKE WHEN THE OPERATOR IS UNDER THE INFLUENCE OF ALCOHOL

FIELD OF INVENTION

This invention relates to apparatus for preventing drunken driving, and more particularly to apparatus which is additionally capable of distinguishing between drunken drivers and drunken passengers.

BACKGROUND

The present invention is concerned with the numerous accidents which occur in the operation of automotive vehicles and the like, and especially with the high proportion of such accidents which result from the incapacity operators to operate their vehicles, such as, for example, when they are under the influence of alcohol or the like.

In considering the problem of detecting whether the operator of a vehicle is drunk or not, it must be taken into consideration that the driver may be accompanied by one or more passengers who are under the influence of alcohol, whereas the driver may be completely sober. In such event it is of course desirable that the vehicle remain operative, since it is under the control of a competent person.

SUMMARY OF INVENTION

It is an object of the invention to provide a means for detecting the incapacity of the operator of a mobile vehicle, in order to render the vehicle inoperative.

It is a further object of the invention to prevent the operation of a mobile vehicle by a driver who lacks the capacity to operate such vehicle and to distinguish between a driver who is capable of operating his vehicle and fellow passengers who may be under the influence of alcohol.

In achieving the above and other of the objects of the invention, there is provided an apparatus which comprises the mobile vehicle with means therein to permit the operation of the vehicle by an operator and detector means to detect said operator's incapacity to operate said vehicle, there being furthermore provided control means responsive to said detector means to render the first said means inoperative.

The detector means mentioned above may include means to detect the alcoholic content of the operator's exhalation. This in fact constitutes a preferred embodiment of the invention.

The detector means may furthermore include means to distinguish between the alcoholic content of the operator's exhalation and the exhalation of a fellow passenger.

The first said means mentioned hereinabove may be an ignition circuit for the vehicle and a power supply therefor, and the control means may be a relay for disconnecting the ignition circuit from the power supply.

According to a feature of the invention, the detector means may include ventilating means for venting the interior of the vehicle when the alcoholic content is detected in the exhalation of a passenger, rather than in the exhalation of the operator.

According to a further feature of the invention, the aforesaid detector means may include a sensitivity adjuster. Furthermore, the detector means preferably may include a Zener diode and a relay operated thereby.

The detector means may, in accordance with a further feature of the invention, include a means for indicating that the operator is under the influence of alcohol or the like.

According to a further feature of the invention, said detector means may be located directly in front of the operator, such as in the steering wheel or the like.

Further provided in accordance with the invention, is a means to restore the vehicle to operative condition.

The above and other objects and features of the invention will be found in the detailed description which follows hereinafter, as illustrated in the accompanying drawing.

DETAILED DESCRIPTION

Figure 1:
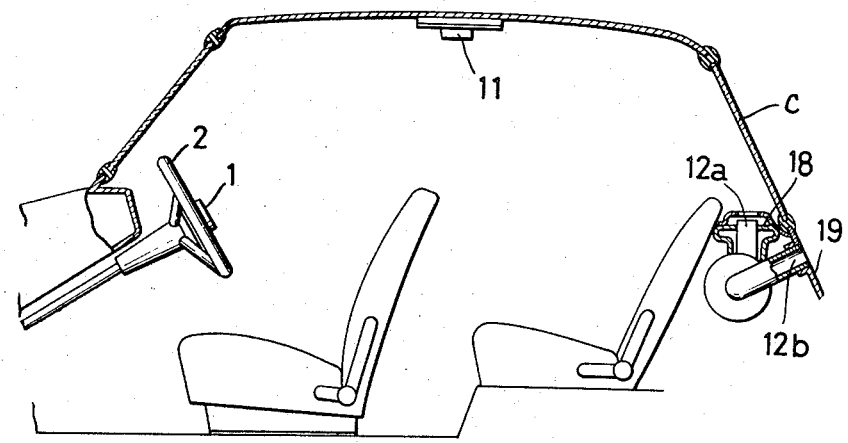
FIG. 1 is a side view, partly in section, of a motorcar provided with a detection apparatus of this invention.

In FIG. 1, detecting apparatus 1 for detecting alcohol content in the exhalation of a driver is provided at a position which directly receives the exhalation of the driver. This position can be, for example, at the center of a steering wheel 2.

Figure 2:
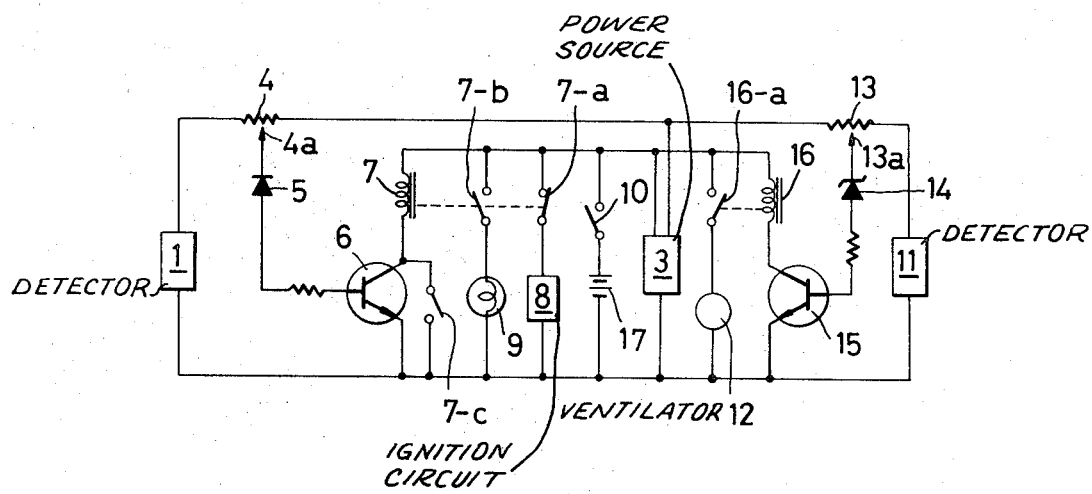
FIG. 2 is a schematic electric circuit diagram of the detecting apparatus.

As shown in FIG. 2, this detecting apparatus 1 is connected in series with an electric power source 3 (a DC-AC convertor in the illustrated example) through a sensitivity adjusting variable resistor 4. A movable member or brush 4a of the variable resistor 4 is connected to the base terminal of a switching transistor 6 through a Zener diode 5. Relay contacts 7a and 7b of a relay 7 interposed in the collector circuit of the transistor 6 are interposed in an engine spark plug circuit 8 or in any other electric circuit and in an indication lamp 9 circuit, respectively.

The foregoing detecting apparatus 1 may be, for example, a combustible-gas detecting device wherein a combustible gas is burned if the same is brought into contact with a heated platinum filament. An electric resistance change is caused by a rise in the temperature of the filament due to such burning.

If a drunken driver sits in the driver's seat and closes a main switch 10, the electric resistance value of the detecting apparatus 1 will be varied and the voltage across the same will be changed due to the alcohol content in the exhalation of the driver. When the potential of the movable member 4a rises above the Zener voltage of the Zener diode 5, the transistor 6 switches "on" to operate the relay 7. The ordinarily closed contact 7a thereof is then opened to separate the spark plug circuit 8 from its electric source 17. As a result, spark plug firing becomes impossible and the motorcar is made inoperative.

At the same time, the ordinarily open contact 7b of the relay 7 is closed to indicate that the driver is drunk. Simultaneously, the relay 7 is held inoperative condition by a closing of a relay contact 7c. Therefore, in the event that a person who is not drunk intends to replace the drunken driver, he must first open the main switch 10 so that the relay 7 is made inoperative whereby the spark plug circuit 8 is returned to its operative condition. Thereafter, the main switch 10 is again closed and the motorcar is rendered operative.

Relative to the drunken driving preventing apparatus described above, it is possible that the driver may not be drunk but that a fellow passenger is drunk. In such case, the apparatus might detect the alcohol content in the exhalation of the fellow passenger and render the motorcar inoperative. Furthermore, the exhalation of such a fellow passenger might require more time to act on the detecting apparatus than the exhalation of the driver, due to the passenger's being further from detector 1 than the driver, so that the detecting apparatus 1 might operate after the motorcar has started running. This can bring about various dangerous situations.

This invention has as an object the preventing of the occurrence of such situations. To this end, a second detecting means or apparatus 11 for detecting the alcohol content in the exhalation of fellow passengers is provided and, by the operation thereof, a ventilation apparatus 12 is operated for ventilating the interior of the car so as to avoid incorrect operation. One or more of such ventilating devices may be provided wherever required.

As shown in FIG. 2, the second detecting apparatus 11 is connected in series with the electric power source 3 through a sensitivity adjusting variable resistor 13. Movable member or brush 13a of the variable resistor 13 is connected to the base terminal of a switching transistor 15 through a Zener diode 14. A relay contact 16a of a relay 16 interposed in the collector circuit of the transistor 15 is provided in the circuit of the ventilation apparatus 12.

In FIG. 2 an intake opening 12a of the ventilation apparatus 12 opens through a shelf 18 provided behind the rear seat, and a discharge opening 12b of the same opens to the outside through a rear portion outer wall 19 of the car body C.

With the foregoing construction, if the driver is not drunk but a fellow passenger is, it is arranged that due to the alcohol content in the atmosphere in the car interior, the electric resistance value of the second detecting apparatus 11 is varied earlier than is the first detecting apparatus 1 and the voltage across the same is varied. This may be achieved, for example, by making detector 11 more sensitive than detector 1 although this is not in all arrangements necessary.

When the potential of the movable member 13a rises above the Zener voltage, the transistor 15 switches "on" to operate the relay 16. Thereby, the contact 16a is closed to operate the ventilation apparatus 12. Accordingly, the interior of the car is ventilated and it is avoided that the motorcar is made inoperative by the operation of the first detecting apparatus 1. When, however, the driver is drunk, his exhalation acts directly on the first detecting apparatus 1 so that the first detecting apparatus 1 operates prior to the second detecting apparatus to make the motorcar impossible to drive.

Thus, according to this invention, apparatus is provided such that it prevents a motorcar from being driven by detecting that its driver is drunk. When only a fellow passenger is drunk, this is detected and the ventilation apparatus is operated. Thereby the interior of the car is ventilated so that incorrect detector operation is avoided. Accordingly, it can be prevented that the detector makes the running of the motorcar impossible at an unnecessary time.

The details of an illustrated device to constitute detecting apparatus 1 and the like are shown in U.S. Pat. No. 3,507,145 of Apr. 21, 1970 (Jack C. Loh).

There will now be obvious to those skilled in the art many modifications and variations of the circuits and apparatus set forth hereinabove. These modifications and variations will not depart from the scope of the invention if defined by the following claims.

What is claimed is:

1. Apparatus comprising a mobile vehicle, means to permit operation of said vehicle by an operator, detector means to detect said operator's incapacity to operate said vehicle, and control means responsive to said detector means to render the first said means inoperative, said detector means including means to detect the alcoholic content of said operator's exhalation and first and second means to distinguish between the alcoholic content of said operator's exhalation and the exhalation of a passenger, said first means being located in front of the operator and said second means being located adjacent the passenger; the said detector means further including ventilating means positioned rearwardly in said vehicle for venting the interior of the vehicle when the alcoholic content is detected in the exhalation of said passenger rather than in the exhalation of said operator.

2. Apparatus as claimed in claim 1 wherein the first said means is an ignition circuit for said vehicle and a power supply therefor and the control means is a relay for disconnecting the ignition circuit from the power supply.

3. Apparatus as claimed in claim 1 wherein said detector means includes a sensitivity adjuster means.

4. Apparatus as claimed in claim 3 wherein said detector means includes a Zener diode and a relay operated thereby.

5. Apparatus as claimed in claim 1 wherein said detector means includes an indicator means.

6. Apparatus as claimed in claim 1 wherein said detector means is located directly in front of the operator.

7. Apparatus as claimed in claim 1 comprising means to restore the first said means to operative condition.

* * * * *